(12) United States Patent
Peterson et al.

(10) Patent No.: US 8,094,193 B2
(45) Date of Patent: Jan. 10, 2012

(54) PRESENTATION VIDEO CONTROL SYSTEM

(75) Inventors: Brent Peterson, Excelsior, MN (US);
Robin Sheeley, Maple Plain, MN (US)

(73) Assignee: New Vad, LLC, New Hope, MN (US)

( * ) Notice: Subject to any disclaimer, the term of this patent is extended or adjusted under 35 U.S.C. 154(b) by 996 days.

(21) Appl. No.: 11/527,120

(22) Filed: Sep. 26, 2006

(65) Prior Publication Data
US 2007/0081080 A1 Apr. 12, 2007

Related U.S. Application Data

(60) Provisional application No. 60/725,976, filed on Oct. 12, 2005.

(51) Int. Cl.
*H04N 5/225* (2006.01)
*H04N 5/232* (2006.01)

(52) U.S. Cl. .......... 348/169; 348/211.6; 348/211.7; 348/211.11

(58) Field of Classification Search .......... 348/169
See application file for complete search history.

(56) References Cited

U.S. PATENT DOCUMENTS

| | | | | |
|---|---|---|---|---|
| 6,731,334 | B1 * | 5/2004 | Maeng et al. | 348/211.12 |
| 6,977,676 | B1 * | 12/2005 | Sato et al. | 348/211.11 |
| 6,992,702 | B1 * | 1/2006 | Foote et al. | 348/211.8 |
| 7,015,953 | B2 * | 3/2006 | Parker et al. | 348/211.4 |
| 7,113,201 | B1 * | 9/2006 | Taylor et al. | 348/14.08 |
| 7,349,005 | B2 * | 3/2008 | Rui et al. | 348/14.11 |
| 7,349,008 | B2 * | 3/2008 | Rui et al. | 348/169 |
| 7,428,000 | B2 * | 9/2008 | Cutler et al. | 348/14.11 |
| 7,512,883 | B2 * | 3/2009 | Wallick et al. | 715/717 |
| 2003/0123728 | A1 * | 7/2003 | Dimitrova et al. | 382/173 |

OTHER PUBLICATIONS

Parkervision, Inc., Digital CameraMan, Broadcast Robotic Camera System & SHOT Director, www.pvtv.com, (unknown date, approximately Mar. 2002), Jacksonville, FL.
Parkervision, Inc., 1-CCD General Pan/Tilt Camera System, Installation and Operations Manual, 2000, (Ref# LPMCPT1B), Revision D.
Parkervision, Inc., VTEL Parkervision CameraMan Installation Procedures, 8/97, 907-818-01 REV A.

* cited by examiner

*Primary Examiner* — Ngoc-Yen T Vu
(74) *Attorney, Agent, or Firm* — Beck & Tysver, P.L.L.

(57) ABSTRACT

The present invention is a camera control system designed for video capture of a presentation made in a lecture hall or similar place. The system combines preset views triggered by presence-sensing devices at fixed locations with views tracking the motion of the presenter elsewhere. A tracking camera displays a preset view when the presenter steps on a switch mat or enters into the region of detection of some other presence sensor such as an infrared sensor. At other times, the tracking camera is guided by motion detection logic that uses a wide field of vision provided by a reference camera. The reference camera, the tracking camera, and the presence-sensing devices are integrated by a controller. Various parameters can be configured by a user through a graphical user interface on a computer, manual controls on the box housing the controller, or a hand-held remote control device.

23 Claims, 8 Drawing Sheets

PRESENTATION VIDEO CONTROL SYSTEM

CROSS-REFERENCES TO RELATED APPLICATIONS

The present application claims the benefit of priority of a U.S. provisional application Ser. No. 60/725,976, filed Oct. 12, 2005, and incorporated herein by reference in its entirety.

FIELD OF THE INVENTION

The present invention relates generally to video recording equipment. More specifically it is directed to a camera control system that permits a tracking camera to follow a presenter using triggers at preset locations and motion detection by a reference camera.

BACKGROUND OF THE INVENTION

In a lecture hall, a presenter may move between a blackboard or demonstrative exhibit and other locations on a stage. Live viewers in the audience will typically track the motion of the presenter and follow the presentation in its natural sequence. A problem arises when an effort is made at automated filming of the live lecture for recording onto a recording medium or transmission to a remote location. In many instances, a viewer will see the lecturer move out of the screen, disrupting the presentation in the mind of the viewer. There have been several relatively straightforward solutions proposed for this problem. The easiest solution, other than to require the presenter to stand rigidly in a fixed location, is to simply create a wide-angle view of the presentation stage so that the lecturer is always present in the field of view of the camera. This replicates to some extent the live experience of a viewer in the audience. However, the video presentation of such an image appears remote and small-scale features such as notes on a whiteboard will be invisible. Another solution to this problem is to have a series of switch mats on the floor so that the lecturer activates preset camera views. For example, several preset cameras can be focused at various locations in the room and when the lecturer steps onto one of these locations it activates the associated camera view. This always presents the lecturer in the appropriate view and scale. However, transitions between views are "jumpy" and the sequence viewed on video lacks the fluidity and pace of conventional live viewing of the same scene. Yet another alternative has been the use of motion tracking cameras. Motion tracking cameras are widely available and used in the security industry. They are less used in lecture hall and presentation settings because, when the speaker is standing in a fixed position such as at a podium, the camera view is less stable than would be captured by a preset view triggered by a switch mat. Also, motion tracking cameras are easily confused. For example, a motion-detecting camera will not know which of two people to follow during a lecture if they are both present in the field of view. Audience motion can also provide inappropriate camera panning and zooming. In general the shortcomings of motion detecting cameras have prevented their use and adoption.

SUMMARY OF THE INVENTION

In contrast to prior art systems, the present invention combines preset camera views with motion tracking when the presenter moves between preset locations. Switch mats and other presence sensors detect when a speaker is in a preset area, causing a tracking camera to display a preset view. A reference camera, having a wide field of vision, detects motion, causing the tracking camera to follow the motion while the speaker is not in a preset region. A user can select regions of the field of vision of the reference camera to mask out, thereby preventing the detection of superfluous motion, such as reflections and movement of people in the audience. Integration of the two cameras is handled by logic in a controller, in conformance with options selected by a user through a user interface. A user can configure the operation of the system in several ways; for example, through physical controls on a controller box, a graphical user interface within application software on a computer, and a handheld remote control unit. Multistep presets can be used with two or more presenters.

DETAILED DESCRIPTION OF THE INVENTION

Sensors and Reference Camera Provide Position to the Controller

Figure 1:
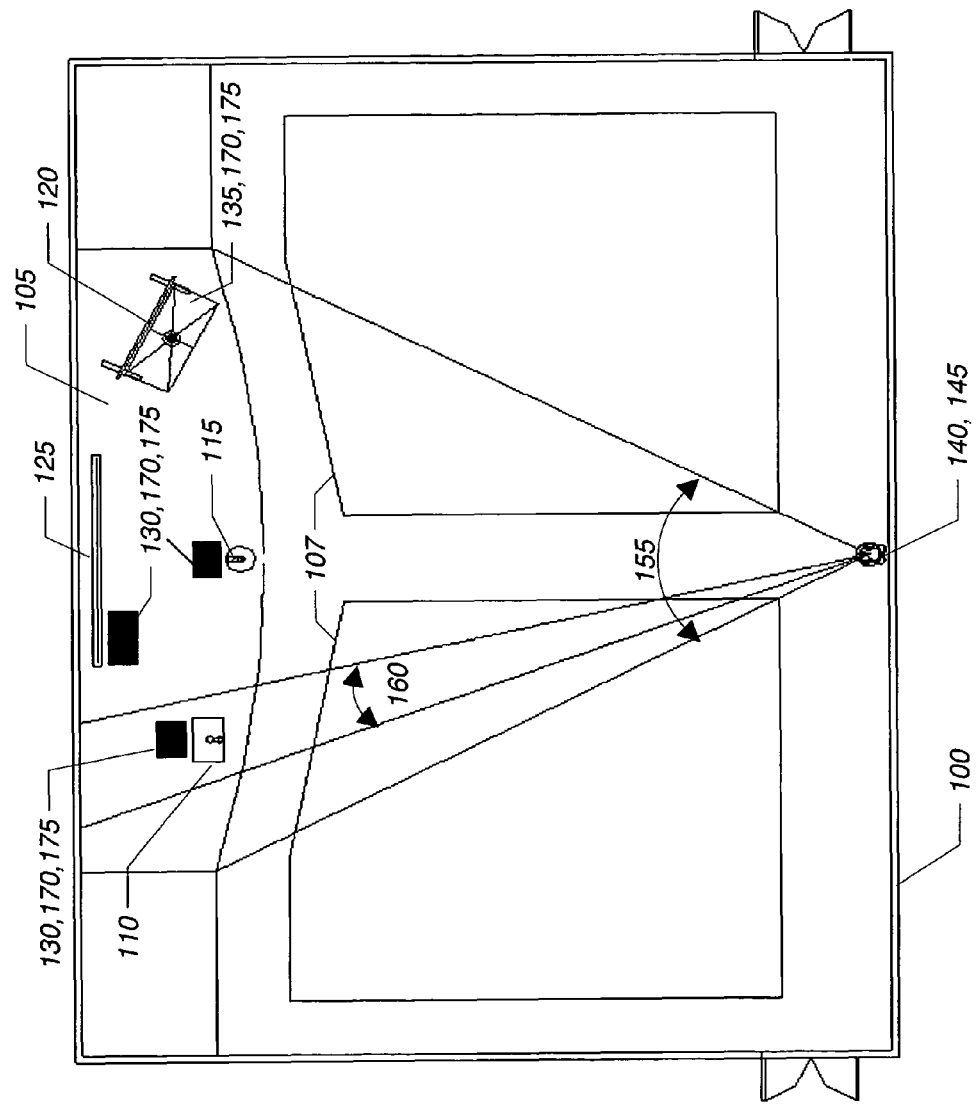
FIG. 1 is a schematic diagram showing a top view of a lecture hall set up to practice the invention.

FIG. 1 through FIG. 4 illustrate one embodiment of the invention in the environmental context of its application. In FIG. 1, an overhead view of a room 100 or lecture hall 100 is shown with a stage 105 located at the front. A seating area 107 for the audience is shown. A lectern 110 is found on the left side of the stage 105. A projection screen 125 is located in the center of the stage 105 toward the back, while a microphone 115 is found at the front of the stage 105 in the center, near the audience.

Figure 6:
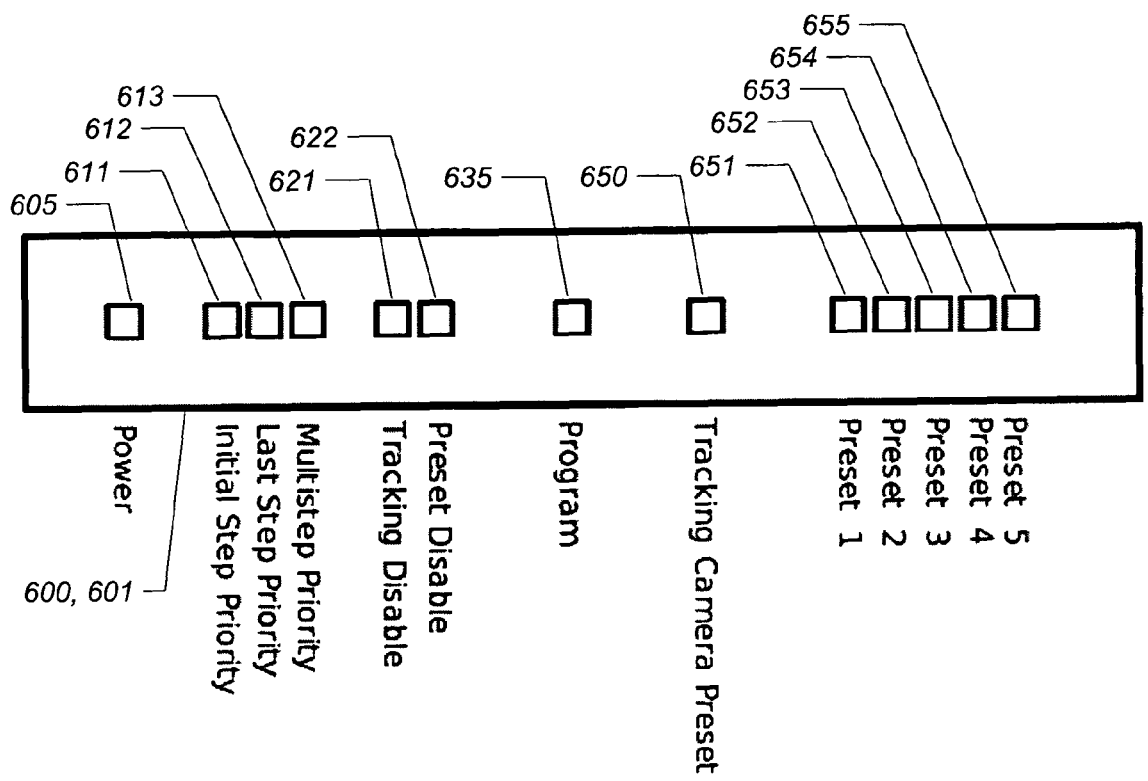
FIG. 6 is a schematic showing a front view of a representative hardware implementation of the controller.
Figure 7:
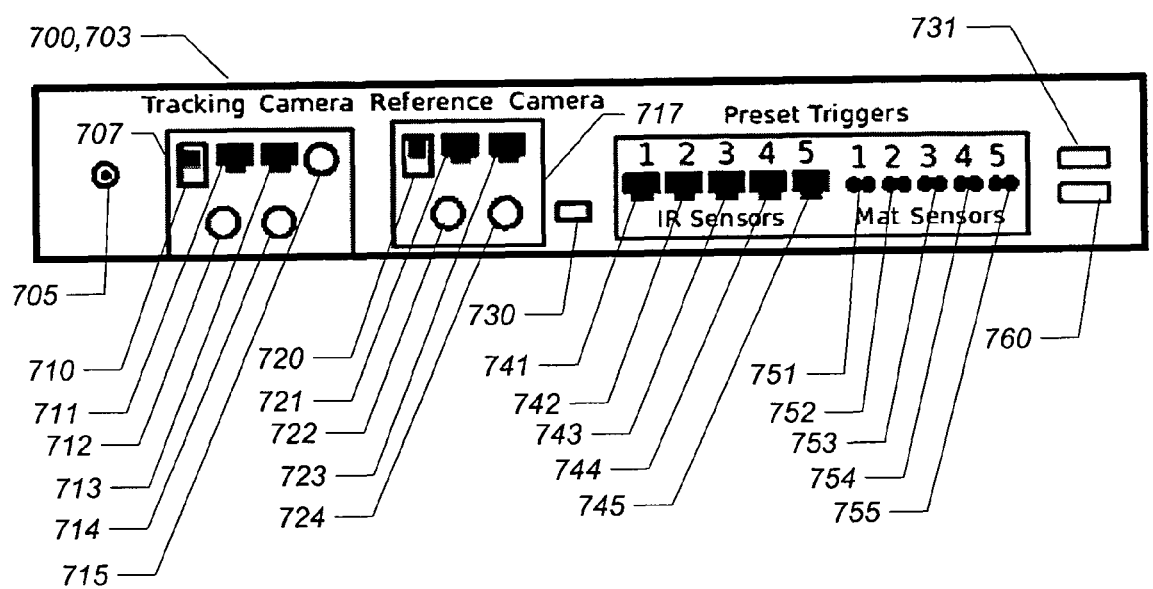
FIG. 7 is a schematic showing a rear view of a representative hardware implementation of the controller.

Three switch mats 130 are shown, one each near the lectern 110, the microphone 115, and the screen 125. While a presenter is standing on a switch mat 130, a trigger is active in the mat 130, sending a signal to a controller 600. The switch mats 130 create trigger zones 175 where preset views of the video cameras can be used. A particular controller 600 implementation is illustrated in FIG. 6 and FIG. 7, and will be described below in connection with those figures.

Figure 2:
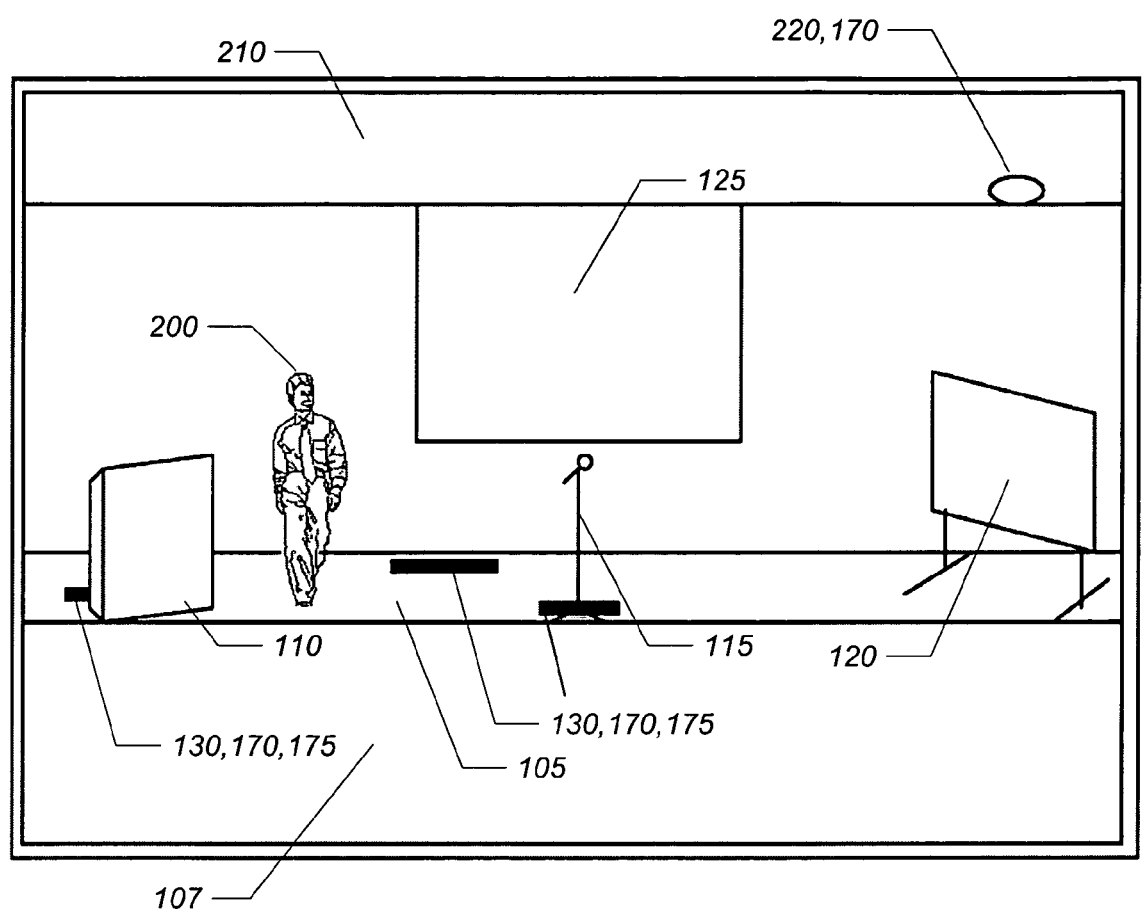
FIG. 2 is a schematic diagram showing a front view of a lecture hall set up to practice the invention.

A demonstration area 135 in front of a whiteboard 120, located on the right side of the stage 105, is monitored by a second kind of presence sensor 170, an IR sensor 220. The demonstration area 135 is another trigger zone 175. FIG. 2 shows a front view of the same stage 105, in this case with a presenter 200 near the lectern 110. The IR sensor 220 is mounted in the ceiling 210, above the demonstration area 135. Functionally, the IR sensor 220 behaves like the switch mats 130. While a presenter 200 is within the demonstration area 135, a trigger is active in the IR sensor 220, sending a signal to the controller 600.

As shown in FIG. 1, a tracking camera 140 and a reference camera 145 are located at the back of the hall 100. The video output produced by the tracking camera 140 is the primary deliverable of the system. This video output can be transmitted for remote viewing at selected locations, broadcast over communications media, or recorded for later viewing. The controller 600 sends movement commands to the tracking camera 140 and receives video output from the tracking camera 140. The connection by which this communication occurs, as well as any other connection within the invention, might be wired or wireless.

Once configured, the reference camera 145 will have a fixed view and be non-moving. The video output from the reference camera 145 is input to the controller 600. The controller 600 contains logic, implemented in software, hardware, or some combination thereof, for detection of motion in the reference camera 145 video. The main task of the controller 600 is to integrate the information received from the presence sensors 170 and the reference camera 145 to control the movement of the tracking camera 140, thereby dictating how its view of the hall 100 changes as the presentation proceeds. An implementation of the control logic will be discussed below in connection with FIG. 5.

The reference camera 145 will have been previously configured to take into account the position of the stage and other characteristics of the environment. The reference camera 145 must be able to distinguish motion of the presenter 200 from other motion in the room. Superfluous motion includes motion of people in the audience, projected motion such as a video presentation on the screen 125, motion outside the hall 100 visible through windows and doors, and motion reflected by objects in the room. The special circumstance of two or more presenters 200 on the stage will be discussed later.

Figure 3:
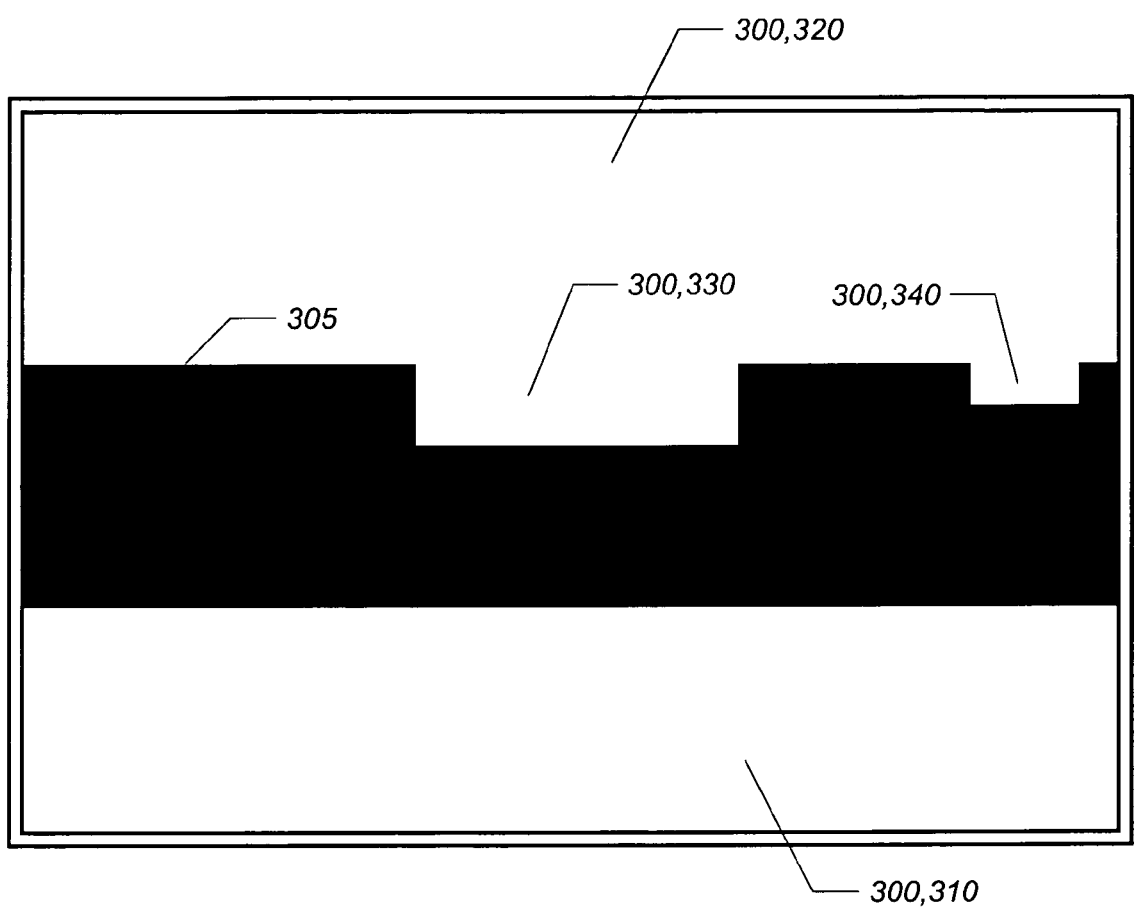
FIG. 3 is a schematic diagram showing a mask to eliminate detection of superfluous motion.
Figure 4:
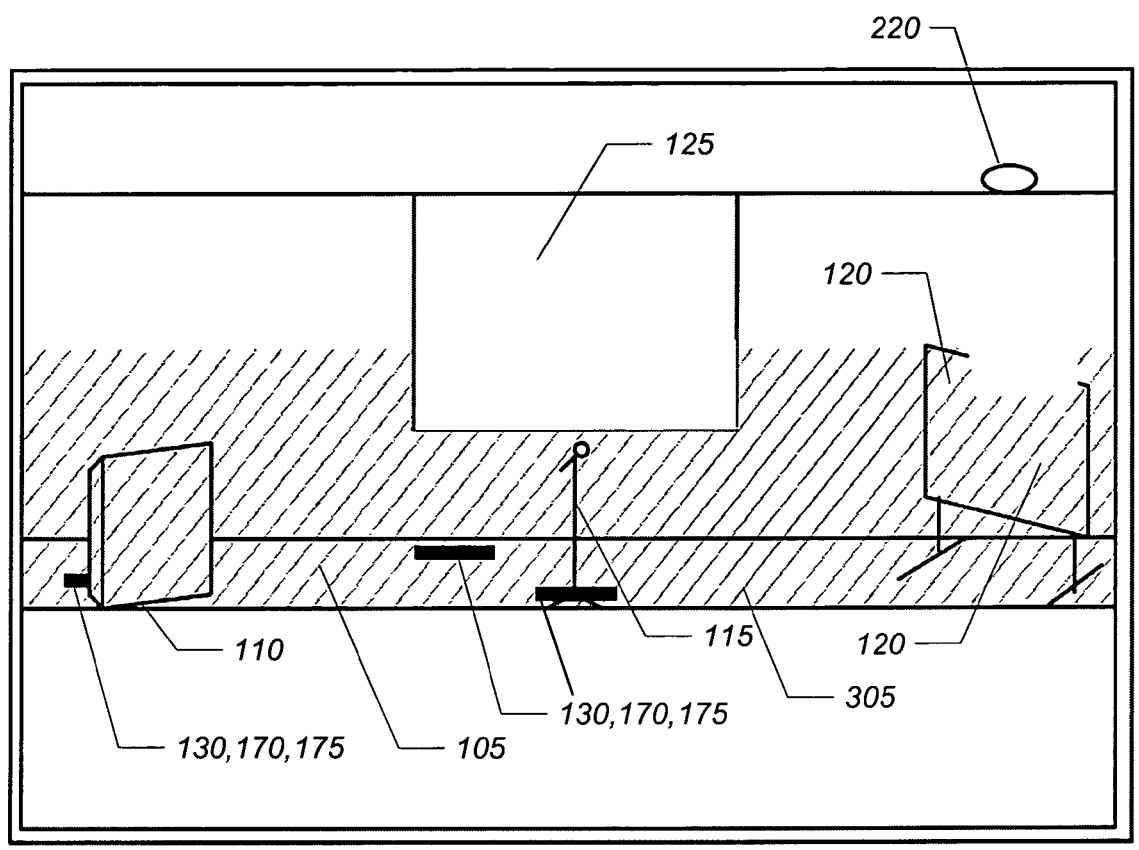
FIG. 4 is a schematic diagram showing regions of the hall that are masked out.

One method of the invention for eliminating superfluous motion is to restrict the fixed view of the reference camera 145. Left and right bounds can be configured that govern the angle 155 subtended by the reference camera 145, shown in FIG. 1. A second method is to mask out portions of the view of the reference camera 145 from delivery to the motion detection logic. FIG. 3 illustrates a mask 300 that might be used for the reference camera 145 view depicted by FIG. 2. The unmasked area 305, shown in solid black, covers much of the stage 105 and background. Video from the white areas, composing the mask 300, will not be delivered to the motion detection logic. The mask 300 includes a seating area mask 310 to mask out the audience in the lower part of the figure; an upper area background mask 320 to mask out motion above the head of the speaker; a cut-out 330 to mask out the lower portion of the projection screen 125; and a notch 340 to mask out the top portion of the whiteboard 120, from which reflections have presumably been observed to occur. The hatched portion of FIG. 4 illustrates the unmasked area 305 of the view of the reference camera 145 that would be presented to the motion detection logic in the controller 600. Notice, in particular, that the switch mats 130 and the demonstration area 135 by the whiteboard 120 are within the unmasked area 305.

Other parameters can be configured to tune the motion detection functionality of the controller 600. In one embodiment, these parameters are specified by a user through a graphical user interface (GUI) presented by application software running on a computer (not shown) that is in communication with the controller 600. Some exemplary GUI parameters will be enumerated below.

A plurality of preset configurations of the tracking camera 140 can be programmed by a user into the controller 600. A configuration might include settings determining its view, such as zoom, pan, and tilt, and focus. The controller 600 issues movement commands to the tracking camera 140 to change its view. In various embodiments, one or more of these settings (e.g., focus) might be handled autonomously by the tracking camera 140 itself, rather than by the controller 600 through a preset configuration. Typically, a preset is configured to best capture a natural view when the presenter 200 is located in a trigger zone 175. In some embodiments of the invention, the position of the tracking camera 140 is locked while a preset configuration is active; in others, the tracking camera 140 might be able to change its view somewhat within the trigger zone 175. Even if the tracking camera 140 is locked in a preset position, the reference camera 145 should continue to provide video to the controller 600 and the motion detection logic should continue to operate, so that tracking can smoothly and immediately begin again should the presenter 200 leave the trigger zone 175.

Controller Changes Tracking Camera View

The controller 600 receives a video feed from the reference camera 145 that it uses primarily for motion detection. It also receives signals from the presence sensors 170 that indicate whether the presenter 200 is in a trigger zone 175. A key task of the controller 600 is to integrate this information from multiple sources, thereby issuing motion commands that cause the tracking camera 140 to appropriately change the view it outputs throughout the course of the presentation. The tracking camera 140 changes its view by movement (e.g., zoom, pan, and tilt) operations. Generally speaking, when a single presenter 200 is in a trigger zone 175 the tracking camera 140 assumes the corresponding preset view. Otherwise, the tracking camera 140 is following the motion.

Figure 5:
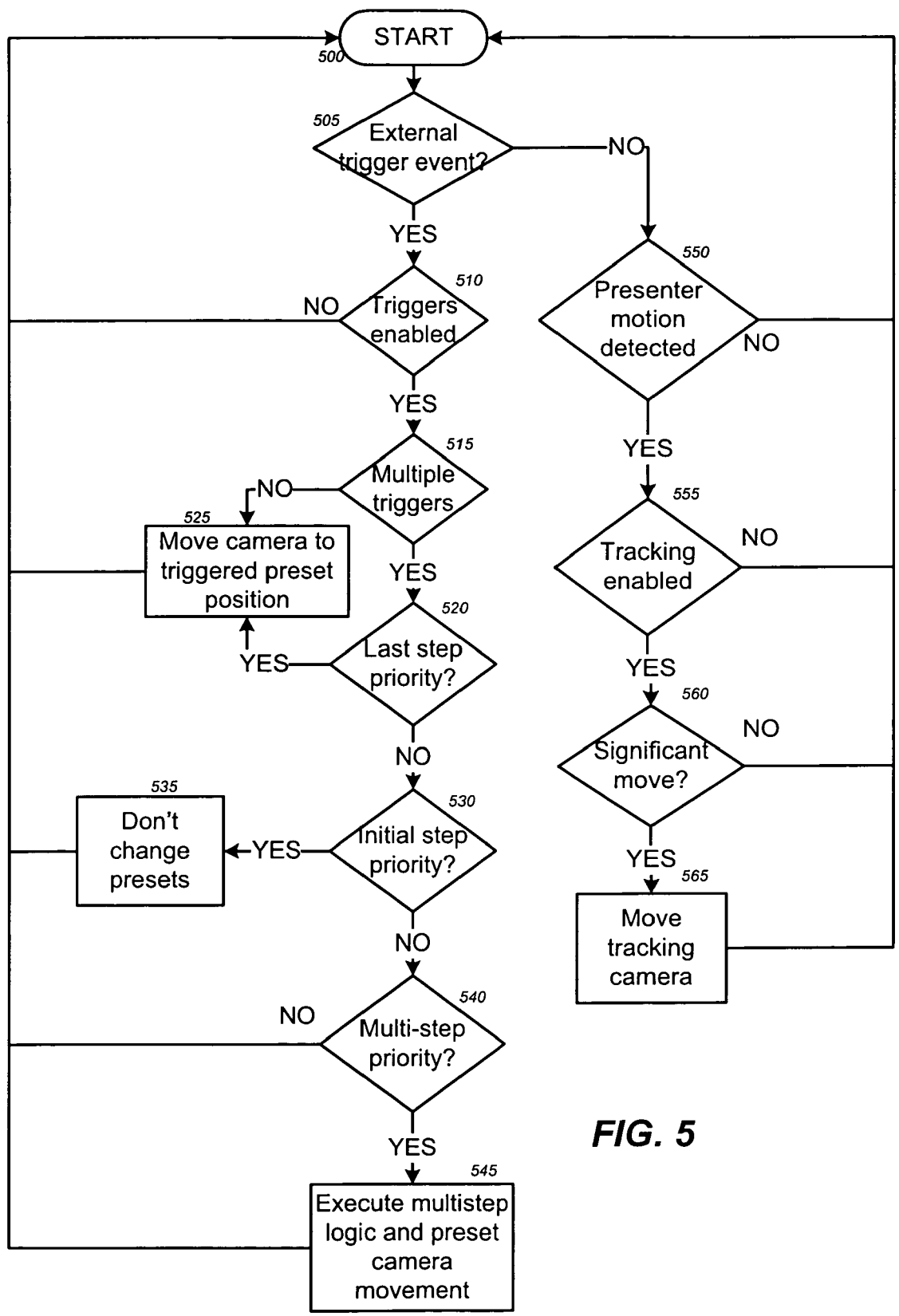
FIG. 5 is a flowchart showing logic for the control algorithms to operate the cameras.

A detailed embodiment of the integration logic, which also contemplates more than one presenter, of the controller 600 is illustrated in the flowchart of FIG. 5. This embodiment behaves as a continuous loop while the system is operational, so all flow paths lead eventually back to the start state 500. A trigger is active when one of the presence sensors 170 detects that a person is within a trigger zone 175. If a trigger is active 505 but triggers are disabled 510, the flow returns to the start state 500. On the other hand, if triggers are enabled, they are vetted 515 for whether multiple triggers are active. If not, then the controller 600 commands the tracking camera 140 to move 525 to the preset position.

The situation when multiple triggers are active is handled by the lower half of the left-hand branch of the flowchart. Multiple triggers being active indicates that two or more people are present on the stage, such as a professor and an assistant. The invention has three alternative modes for dealing with this situation. In last step priority mode 520, the tracking camera 140 moves to the trigger zone 175 last activated. In initial (or first) step priority mode 530, the tracking camera 140 retains 535 the preset view of the first trigger zone 175 for so long as it is activated. In multistep priority mode 540, the controller 600 orders the tracking camera 140 to present a specially defined preset view, which typically will encompass the multiple active trigger zones 175. For example, if a first presenter 200 were standing at the lectern 110 and a second presenter 200 were standing by the whiteboard 120, then a special preset tracking camera 140 view might display both presenters 200.

Returning to step 505, we see that if no trigger is active, then the controller 600 examines the video feed from the reference camera 145 to see whether 550 motion is detected. If so, and if 555 tracking is enabled, and if 560 the movement was significant, then the controller sends commands 565 to the tracking camera 140, causing it to move following the motion, and then the flow returns to the start state 500. Which motion is considered by the motion detection logic to be "significant" can be tuned by various parameters discussed below that are configured through user interface devices.

Configuring the Controller

An embodiment of the invention in which the controller 600 is housed within a control box 601 is illustrated by FIG. 6 (front panel 603) and FIG. 7 (rear panel 703). Power to the control box 601 is provided by the power supply jack 705. Trigger states from IR sensors 220 are input through IR sensor jacks 741-745. Trigger states from switch mats 130 are input through mat sensor jacks 751-755. In this exemplary embodiment, each preset number (1, 2, 3, 4, or 5) can correspond to a switch mat 130, to an IR sensor 220, or to neither, but not to both. In other words, there can be at most 5 presence sensors 170 at once, one for each preset number.

The rear panel 703 contains a tracking camera section 707 and a reference camera section 717. Power to, and video output from, the tracking camera 140 use the video/power jack 711. Some models of tracking camera 140 use a somewhat different configuration, feeding video signal to the controller 600 through the super-video input jack 715 and utilizing an external power supply. The controller 600 sends commands to the tracking camera 140 through the control jack 713. The video signal from the tracking camera 140, which is the primary output of the system, is available through the super-video output jack 712 and the BNC output jack 714. A voltage switch 710 can be used to change the voltage available to the tracking camera 140, with a higher voltage appropriate for a longer cable length from the controller 600 to the tracking camera 140. The reference camera section 717 is similarly configured, except that in the illustrated embodiment, it does not include a counterpart of the super-video input jack 715; it will not be discussed in detail.

Facilities exist to control some operations of the controller 600, as well as to set certain configuration parameters, through application software running on an external computer, typically providing a GUI to the user. Details will be discussed later. Alternative Universal Serial Bus (USB) 730 and serial (RS-232) 731 connections between the computer and the controller 600 are available.

Figure 8:
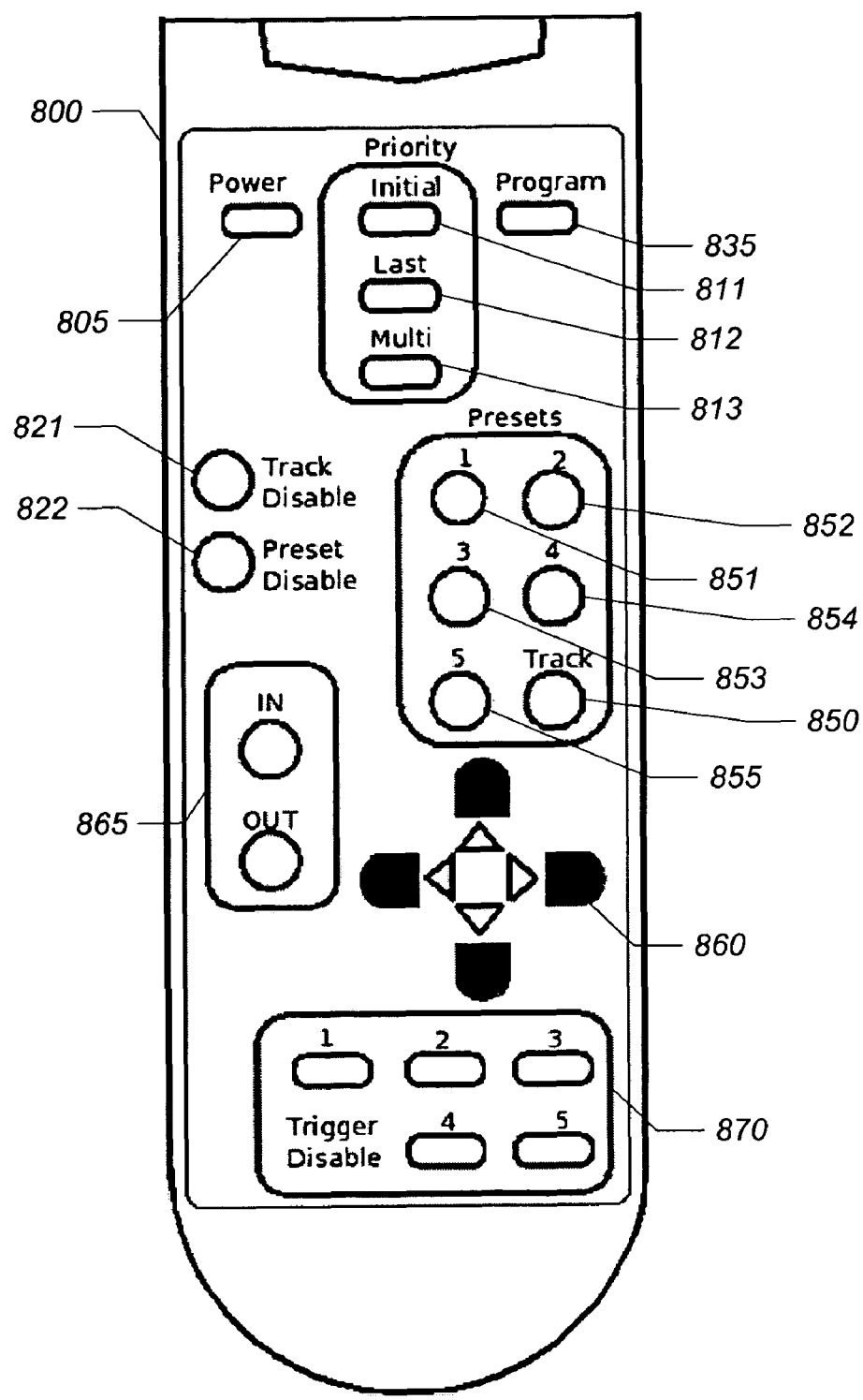
FIG. 8 is a schematic showing a representative implementation of a remote control device.

In the illustrated embodiment, buttons on the front panel 603 (FIG. 6) of the control box 601 and a handheld remote control device 800 (FIG. 8), or remote 800, in addition to the external computer, can be used to configure operations of the controller 600. The front panel 603 contains a power button 605 to turn the system on. The system's priority mode, which affects controller 600 operation as illustrated by FIG. 5 when two persons are present on the stage 105, is selected from among the initial step priority button 611, the last step priority button 612, and the multistep priority button 613. Tracking and preset detection can be enabled or disabled with the tracking disable button 621 and preset disable button 622, respectively. The program button 635 can be used in combination with the tracking camera preset button 650 and the remote 800 to set up the initial position of the tracking camera 140. During this configuration process, the user will see the view of the tracking camera 140 in a monitor (not shown) attached to either the super-video output jack 712 or the BNC output jack 714 on the rear panel 703 of the controller 600. As illustrated in FIG. 8, the remote 800 has pan and tilt buttons 860 and zoom buttons 865 to manually control tracking camera 140 movement. In one embodiment of the invention, the tilt and zoom positions of the tracking camera 140 while tracking are fixed; motion detection only affects pan of the tracking camera 140. Similarly, the program button 635 can be used in combination with one of the presence sensors 170 preset buttons 651-655 and the remote 800 to configure the preset views of the tracking camera 140.

The handheld remote control device 800 provides a flexible means of configuring many aspects of the controller 600. Like the front panel 603 of the controller 600, the remote 800 has a power button 805; buttons 811-813 for selecting from among initial step, last step, or multistep priority modes; a tracking camera preset button 850; and buttons 851-855 for configuring preset views corresponding to the presence sensors 170. The remote 800 contains pan and tilt buttons 860 and zoom buttons 865, as mentioned previously. In addition, the remote 800 has trigger disable buttons 870 for disabling the preset triggers. The presenter 200 can use the remote 800 to adjust the controller 600 during a presentation.

In one embodiment of the invention, general set up of the system is done from an external computer, through a GUI that interacts with the controller 600 by cables connected to its rear panel 703. Through the GUI, the view of the reference camera 145 can be set by manually manipulating its zoom, tilt, and pan until satisfactory values are found and set. During this process, the user can see the view of the reference camera 145 on a monitor receiving video out from the reference camera 145 through the controller 600. The GUI also facilitates configuration of the tracking camera 140 for when it will be moved by the controller 600 based upon the motion detection software. Initial values of zoom, tilt, and pan, as well as left and right limits that correspond to the limits of the field of view of the reference camera 145, can be set. As mentioned previously, in one embodiment of the invention, the zoom and tilt are locked when the tracking camera 140 is tracking a presenter 200; only the pan can change. The GUI is also used to specify both the location and the resolution of the mask 300. Parameters that can be adjusted using the GUI include the tracking speed, which affects how quickly the tracking camera 140 responds to the movement of the presenter 200; the learn rate, which affects whether the tracking camera 140 responds more effectively to slow movement or fast movement of the presenter 200; contrast, which affects the ability of the motion detection software to distinguish noise from actual motion of the subject; minimum move, which defines the number of horizontal cells that must change to be identified as movement; noise filter, which influences the time within which to respond to movement; minimum target width, which defines the minimum width that a moving object must have to be identified as a presenter 200; and tracking window, which defines the width of the tracking window. The GUI allows specification whether video output will satisfy the NTSC or the PAL standard. The GUI also allows a configuration to be backed up or restored, or the system to be reset to the factory default configuration.

The present invention is not limited to all the above details, as modifications and variations may be made without departing from the intent or scope of the invention. For example, the functionality of the tracking camera could be split between two cameras, one dedicated to viewing presets and the other to tracking movement of a presenter, without departing from the central concept of integrating preset sensing zones with tracking away from those zones. As another example, other forms of devices might be used to configure a controller. Consequently, the invention should be limited only by the following claims and equivalent constructions.

What is claimed is:

1. An apparatus for video monitoring of a presentation, comprising:
    a) a first presence sensor that signals to a controller a first preset trigger which is in an active state when the first presence sensor detects that a person is located in a first preset zone, and inactive otherwise, wherein the first preset zone is a spatially fixed region;
b) a reference camera, which captures reference video signal within a reference field of vision and transmits the reference video signal to the controller;
c) a tracking camera that executes motion commands received from the controller; and
d) the controller, which
   (i) receives the state of the first preset trigger from the first presence sensor,
   (ii) receives the reference video signal from the reference camera,
   (iii) contains motion detection logic that detects motion in the reference video signal,
   (iv) receives a user-specified viewing configuration that includes a portion of the first preset zone, and excludes a portion, outside the first preset zone, of the reference field of vision,
   (v) has a first preset capture state, wherein the controller sends at least one command to the tracking camera, thereby causing the tracking camera to suspend tracking and to capture video according to the user-specified viewing configuration,
   (vi) has a motion capture state, wherein the controller sends at least one command to the tracking camera, thereby causing the tracking camera to capture video from a zone that the motion detection logic indicates is proximate to detected motion, and
   (vii) contains capture state selection logic that causes the controller to select among capture states.

2. The apparatus of claim 1, wherein the controller is in the motion capture state when no trigger is active.

3. The apparatus of claim 1, wherein the first presence sensor is a switch mat or an infrared sensor.

4. The apparatus of claim 1, further comprising:
e) a second presence sensor that signals to the controller a second preset trigger which is in an active state when a person is located in a second preset zone and inactive otherwise;
and wherein the controller has a second preset capture state, such that the controller sends at least one command to the tracking camera, thereby causing the tracking camera to capture video from the second preset zone.

5. The apparatus of claim 4, wherein the capture state selection logic includes an initial step priority mode wherein if, while no trigger is active the first trigger becomes active, then the controller remains in the first preset capture state for so long as the first trigger remains active, and a last step priority mode wherein if, while the first trigger is active the second trigger changes from inactive to active, then the controller changes from the first preset capture state to the second preset capture state.

6. The apparatus of claim 5, wherein the controller has a multistep preset capture state in which the controller sends at least one command to the tracking camera, thereby causing the tracking camera to capture video from a third preset zone, and wherein the capture state selection logic further includes a multistep priority mode in which, if two triggers are active simultaneously, then the controller is in the multistep preset capture state.

7. The apparatus of claim 6, further comprising:
e) a user interface, including one or more user controls from a user control group consisting of:
   (i) a reference camera view control, whereby the user can define a fixed view for the reference camera,
   (ii) a tracking camera preset view control, whereby the user can define a fixed view presented by the tracking camera corresponding to a preset,
   (iii) a tracking camera tracking view control, whereby the user can bound the view presented by the tracking camera while it is capturing video from a zone that the motion detection logic indicates is proximate to detected motion,
   (iv) a masking control, whereby the user can define a mask indicating portions of the reference field of vision to be ignored by the motion detection logic when detecting motion in the reference video signal,
   (v) a priority mode selector, whereby a user can select from among initial step priority mode, last step priority mode, and multistep priority mode,
   (vi) a tracking disable control, whereby the user can disable tracking by the tracking camera,
   (vii) a preset disable control, whereby the user can disable sensing by the presence sensors,
   (viii) a preset definition control, wherein the user can define the preset video zones,
   (ix) a motion detection sensitivity control, whereby the user can set a parameter affecting the sensitivity of the motion detection logic, and
   (x) a trigger disable control, whereby the user can disable a preset trigger.

8. The apparatus of claim 7, wherein the user interface is provided by a remote control unit.

9. The apparatus of claim 4, wherein the controller has a multistep preset capture state in which the controller sends at least one command to the tracking camera, thereby causing the tracking camera to capture video from a third preset zone, and wherein the capture state selection logic further includes a multistep priority mode in which, if two triggers are active simultaneously, then the controller is in the multistep preset capture state.

10. The apparatus of claim 1, further comprising:
e) a masking control, whereby a user can provide to the controller a mask defining a fixed area, such that reference video signal from the fixed area will not be considered by the motion detection logic.

11. The apparatus of claim 10, wherein the mask specifies a fixed area where motion, from a source other than a presenter of the presentation, is expected.

12. The apparatus of claim 1, wherein the user-specified viewing configuration specifies fixed values of pan, tilt, and zoom for the tracking camera.

13. A method for video monitoring of a presentation, comprising:
a) signaling, by a first presence sensor to a controller, a first preset trigger that is in an active state when the first presence sensor detects that a person is located in a first preset zone, and inactive otherwise, wherein the first preset zone is a fixed region of a room;
b) capturing, by a reference camera, reference video signal within a reference field of vision and transmitting the reference video signal to the controller;
c) receiving by the controller the state of the first preset trigger from the first presence sensor;
d) receiving by the controller the reference video signal from the reference camera;
e) detecting, by motion detection logic within the controller, motion in the reference video signal;
f) receiving a user-specified viewing configuration that includes a portion of the first preset zone and excludes a portion, outside the first preset zone, of the reference field of vision;

g) selecting by the controller using capture state selection logic from among a set of capture states, including a first preset capture state and a motion capture state;

h) entering the first preset capture state upon its selection by the controller, wherein the controller sends at least one command to the tracking camera, thereby causing the tracking camera to suspend tracking and to capture video according to the user-specified viewing configuration; and i) entering the motion capture state upon its selection by the controller, wherein the controller sends at least one command to the tracking camera, thereby causing the tracking camera to capture video from a zone that the motion detection logic indicates is proximate to detected motion.

14. The method of claim 13, wherein the controller is in the motion capture state when no trigger is active.

15. The method of claim 13, wherein the first presence sensor is a switch mat or an infrared sensor.

16. The method of claim 13, further comprising:

j) signaling, by a second presence sensor to the controller, a second preset trigger that is in an active state when a person is located in a second preset zone and inactive otherwise; and k) entering a second preset capture state upon its selection by the controller, wherein the controller sends at least one command to a tracking camera, thereby causing the tracking camera to capture video from the second preset zone.

17. The method of claim 16, further comprising:

l) selecting by a user a priority mode from a set of priority modes, including an initial step priority mode wherein if, while no trigger is active the first trigger becomes active, then the controller remains in the first preset capture state for so long as the first trigger remains active, and a last step priority mode wherein if, while the first trigger is active the second trigger changes from inactive to active, then the controller changes from the first preset capture state to the second preset capture state.

18. The method of claim 17, the set of priority modes further including a multistep priority mode in which, if two triggers are active simultaneously, then the controller is in a multistep preset capture state in which the controller sends at least one command to the tracking camera, thereby causing the tracking camera to capture video from a third preset zone.

19. The method of claim 18, further comprising:

m) setting a configuration parameter through a user interface that contains one or more controls from a set consisting of the following controls:
   (i) a reference camera view control, whereby the user can define a fixed view for the reference camera,
   (ii) a tracking camera preset view control, whereby the user can define a fixed view presented by the tracking camera corresponding to a preset,
   (iii) a tracking camera tracking view control, whereby the user can limit the view presented by the tracking camera while it is capturing video from a zone that the motion detection logic indicates is proximate to detected motion,
   (iv) a masking control, whereby the user can define a mask indicating portions of the reference field of vision to be ignored by the motion detection logic when detecting motion in the reference video signal,
   (v) a priority mode selector, whereby a user can select from among initial step priority mode, last step priority mode, and multistep priority mode, and
   (vi) a tracking disable control, whereby the user can disable tracking by the tracking camera;
   (vii) a preset disable control, whereby the user can disable sensing by the presence sensors;
   (viii) a preset definition control, wherein the user can define the preset video zones;
   (ix) a motion detection sensitivity control, whereby the user can set a parameter affecting the sensitivity of the motion detection logic, and
   (x) a trigger disable control, whereby the user can disable a preset trigger.

20. The method of claim 19, wherein the user interface is provided by a remote control unit.

21. The method of claim 13, further comprising:

j) eliminating a fixed area, defined by a mask provided through a user masking control, from the reference video signal used by the motion detection logic in the step of detecting motion.

22. The method of claim 21, wherein the mask specifies a fixed area where motion, from a source other than a presenter of the presentation, is expected.

23. The method of claim 13, wherein the user-specified viewing configuration specifies fixed values of pan, tilt, and zoom for the tracking camera.

* * * * *